(12) United States Patent
Nezou et al.

(10) Patent No.: US 11,729,824 B2
(45) Date of Patent: Aug. 15, 2023

(54) MULTI-USER RANDOM ACCESS IN A WIRELESS NETWORK

(71) Applicant: CANON KABUSHIKI KAISHA, Tokyo (JP)

(72) Inventors: Patrice Nezou, Liffre (FR); Stéphane Baron, Le Rheu (FR); Pascal Viger, Janze (FR); Julien Sevin, Saint Aubin du Cormier (FR)

(73) Assignee: Canon Kabushiki Kaisha, Tokyo (JP)

( * ) Notice: Subject to any disclaimer, the term of this patent is extended or adjusted under 35 U.S.C. 154(b) by 577 days.

(21) Appl. No.: 16/497,740

(22) PCT Filed: Apr. 27, 2018

(86) PCT No.: PCT/EP2018/060988
§ 371 (c)(1),
(2) Date: Sep. 25, 2019

(87) PCT Pub. No.: WO2018/197716
PCT Pub. Date: Nov. 1, 2018

(65) Prior Publication Data
US 2020/0107363 A1    Apr. 2, 2020

(30) Foreign Application Priority Data

Apr. 28, 2017 (GB) ................................. 1706878
Jun. 1, 2017 (GB) ................................. 1708775

(51) Int. Cl.
*H04W 74/08* (2009.01)
*H04W 76/11* (2018.01)
(Continued)

(52) U.S. Cl.
CPC ....... *H04W 74/0808* (2013.01); *H04L 1/0003* (2013.01); *H04L 1/0061* (2013.01); *H04W 72/0446* (2013.01); *H04W 76/11* (2018.02)

(58) Field of Classification Search
CPC ............. H04W 74/0808; H04W 76/11; H04W 72/0446; H04W 84/12; H04W 74/0833;
(Continued)

(56) References Cited

U.S. PATENT DOCUMENTS

2016/0227579 A1*  8/2016  Stacey .............. H04W 74/0833
2016/0309508 A1* 10/2016  Li ....................... H04W 74/085
(Continued)

FOREIGN PATENT DOCUMENTS

| GB | 2540213 A | 1/2017 |
| WO | 2017044529 A1 | 3/2017 |
| WO | 2017058167 A1 | 4/2017 |

OTHER PUBLICATIONS

Stephane Baron, et al.,Random RU selection process upon TF-R reception, IEEE Draft, Sep. 4, 2015, pp. 1-9, vol. 802, IEEE-SA Mentor, Piscataway, NJ USA, XP068098236.

*Primary Examiner* — Will W Lin
(74) *Attorney, Agent, or Firm* — Canon U.S.A., Inc. IP Division

(57) ABSTRACT

The present invention provides according to one of its aspects a method of communication in a wireless network comprising an access point and a plurality of stations, the method comprising, at one of the stations:
receiving a trigger frame from the access point, the trigger frame reserving a transmission opportunity on at least one communication channel of the wireless network, the transmission opportunity including random resource units that the stations may access using a contention scheme, wherein the trigger frame includes a first indicator specifying a traffic type of data allowed to be sent on at least one of the random resource units;
determining, based on the first indicator, eligible resource units, among the resource units in the reserved trans-
(Continued)

mission opportunity, for the station to contend for access for transmitting data; and transmitting data on a determined eligible resource unit using a contention scheme.

13 Claims, 9 Drawing Sheets

(51) Int. Cl.
  *H04L 1/00* (2006.01)
  *H04W 72/0446* (2023.01)
(58) Field of Classification Search
  CPC ....... H04W 74/006; H04W 8/04; H04W 8/22; H04W 12/06; H04W 8/065; H04W 4/24; H04L 1/0003; H04L 1/0061; H04L 12/1407; H04L 41/5019; H04L 41/5058; G06F 9/45558; G06F 2009/45595; H04M 15/66

See application file for complete search history.

(56) References Cited

U.S. PATENT DOCUMENTS

| | | | |
|---|---|---|---|
| 2017/0006542 A1* | 1/2017 | Huang | H04W 52/0209 |
| 2017/0188376 A1* | 6/2017 | Noh | H04W 52/42 |
| 2018/0242355 A1* | 8/2018 | Lou | H04W 72/121 |
| 2018/0255589 A1* | 9/2018 | Patil | H04W 74/0833 |
| 2018/0302924 A1* | 10/2018 | Kim | H04W 74/085 |
| 2018/0310336 A1* | 10/2018 | Su | H04W 74/0816 |
| 2018/0310342 A1* | 10/2018 | Patil | H04W 74/0825 |
| 2019/0007977 A1* | 1/2019 | Asterjadhi | H04W 74/0833 |
| 2019/0082468 A1* | 3/2019 | Ahn | H04W 74/0816 |
| 2019/0132872 A1* | 5/2019 | Ko | H04W 28/02 |
| 2019/0182864 A1* | 6/2019 | Huang | H04L 5/0094 |
| 2019/0223219 A1* | 7/2019 | Ahn | H04B 7/0452 |

* cited by examiner

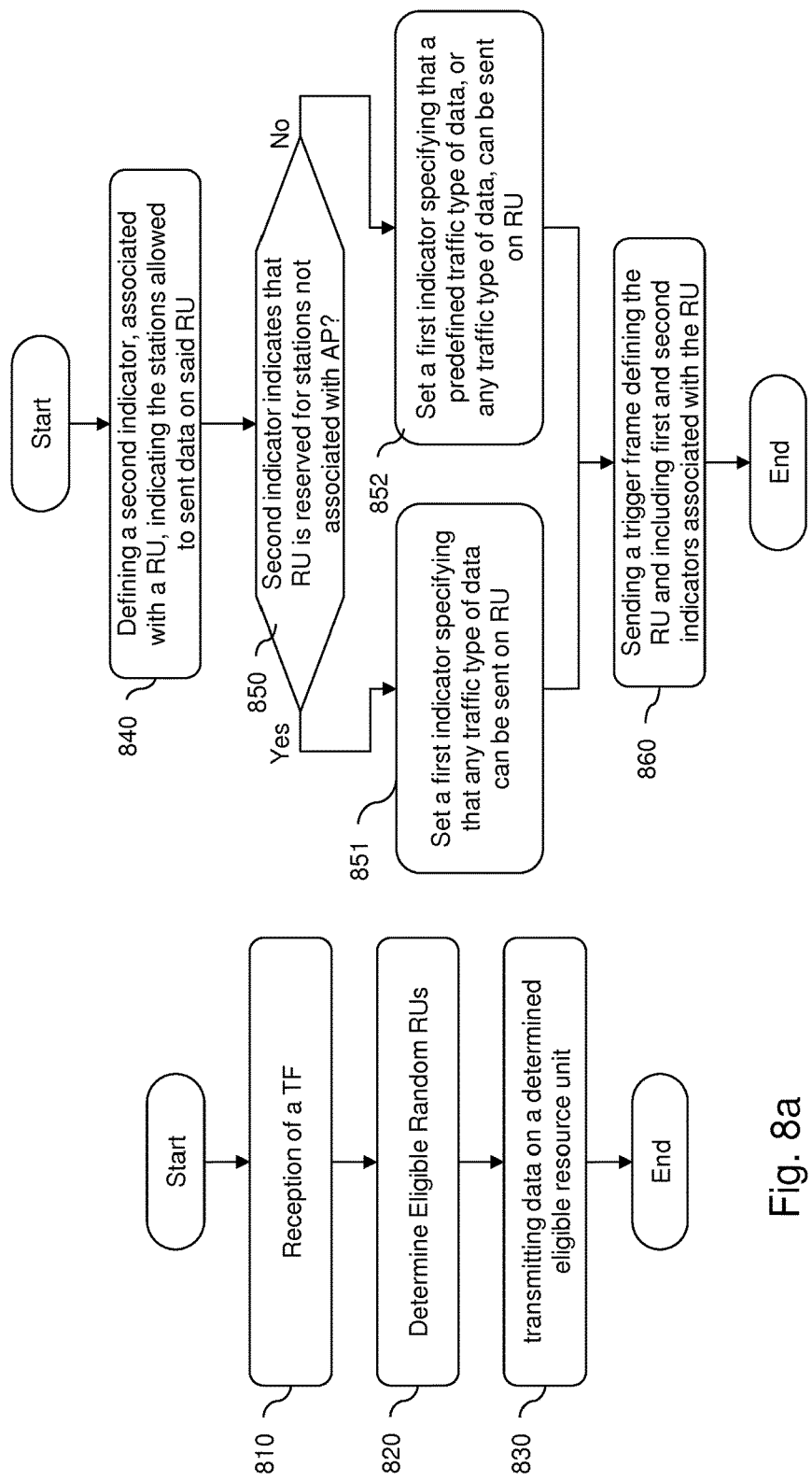

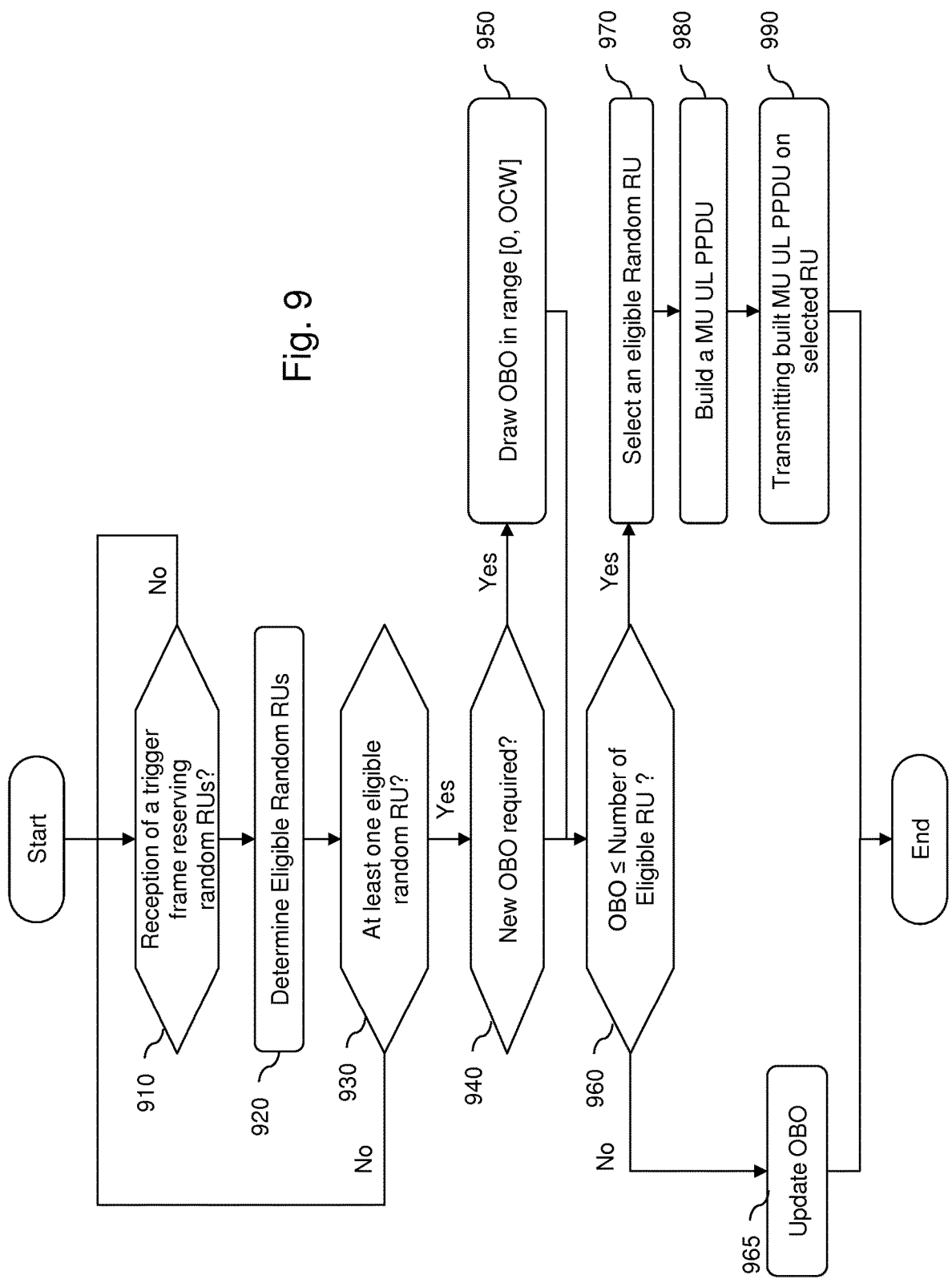

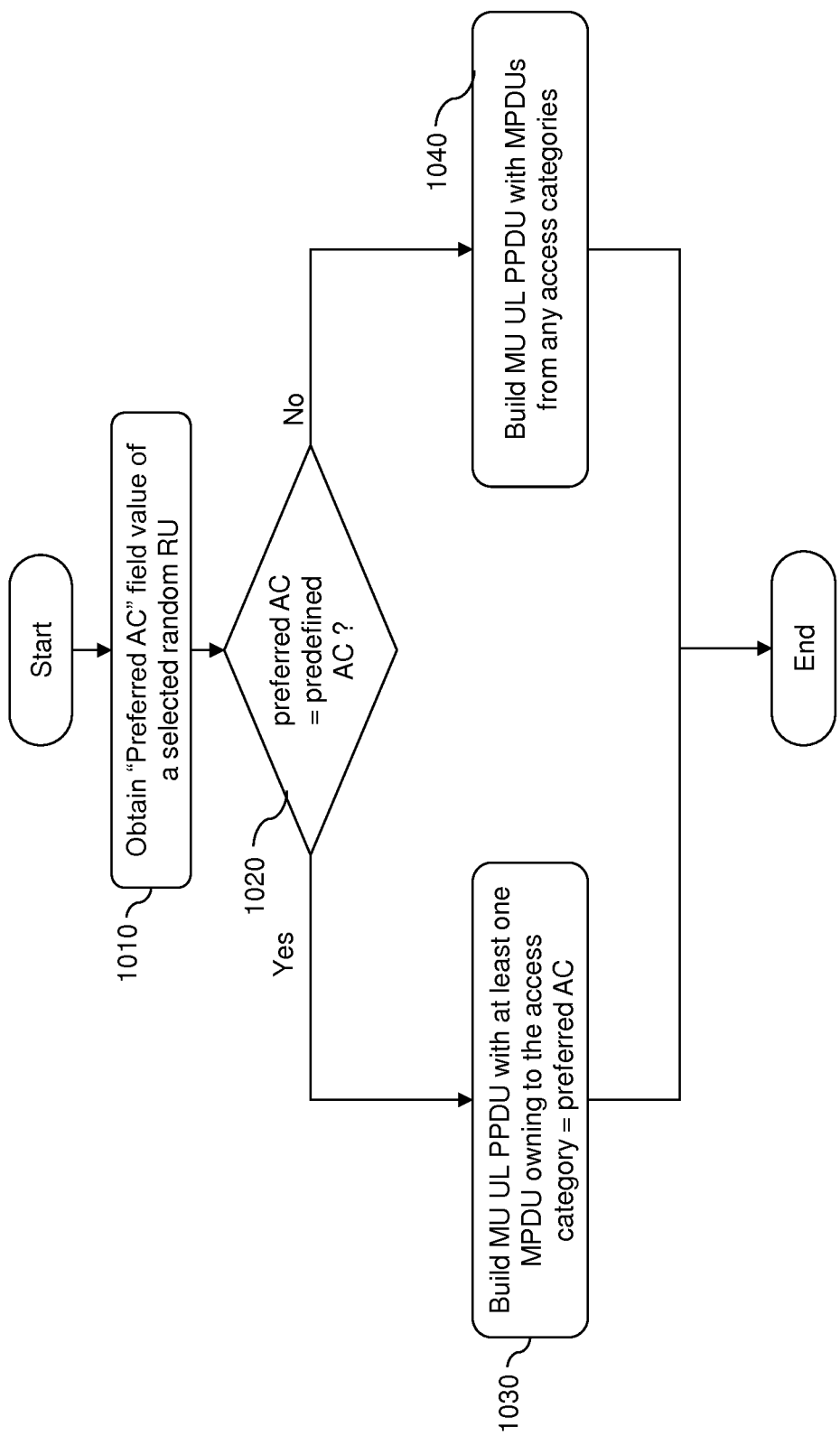

MULTI-USER RANDOM ACCESS IN A WIRELESS NETWORK

CROSS-REFERENCE TO RELATED APPLICATIONS

This application is the National Phase application of PCT Application No. PCT/EP2018/060988, filed on Apr. 27, 2018, which claims the benefit under 35 U.S.C. § 119(a)-(d) of United Kingdom Patent Application No. 1706878.4, filed on Apr. 28, 2017 and No. 1708775.0, filed on Jun. 1, 2017 and both entitled "MULTI-USER RANDOM ACCESS IN A WIRELESS NETWORK." The above-cited patent applications are hereby incorporated by reference herein in their entireties.

FIELD OF THE INVENTION

The present invention relates generally to communication networks and more specifically to communication methods in networks providing accesses to sub-channels (or Resource Units) splitting a transmission opportunity TXOP granted to an access point, in order to transmit data.

BACKGROUND OF THE INVENTION

The IEEE 802.11 MAC family of standards (a/b/g/n/ac/ etc.) defines a way wireless local area networks (WLANs) must work at the physical and medium access control (MAC) level. Typically, the 802.11 MAC (Medium Access Control) operating mode implements the well-known Distributed Coordination Function (DCF) which relies on a contention-based mechanism based on the so-called "Carrier Sense Multiple Access with Collision Avoidance" (CSMA/CA) technique.

More recently, Institute of Electrical and Electronics Engineers (IEEE) officially approved the 802.11ax task group, as the successor of 802.11ac. The primary goal of the 802.11ax task group consists in seeking for an improvement in data speed to wireless communicating devices used in dense deployment scenarios.

In this context, multi-user (MU) transmission has been considered to allow multiple simultaneous transmissions to/from different users in both downlink (DL) and uplink (UL) directions from/to the AP and during a transmission opportunity granted to the AP. In the uplink, multi-user transmissions can be used to mitigate the collision probability by allowing multiple non-AP stations to simultaneously transmit. To actually perform such multi-user transmission, it has been proposed to split a granted communication channel into sub-channels, also referred to as resource units (RUs), that are shared in the frequency domain by multiple users (non-AP stations/nodes), based for instance on Orthogonal Frequency Division Multiple Access (OFDMA) technique.

In order to better improve the efficiency of the system in regards to un-managed traffic to the AP, a random resource selection procedure is defined. According to this procedure, each 802.11ax station maintains a dedicated backoff engine, referred below to as OFDMA or RU (for resource unit) backoff engine, to contend for access to the random RUs defined by a random trigger frame (TF-R). The dedicated OFDMA or RU backoff, also called OBO, is randomly assigned in a contention window range [0, OCW] wherein OCW is the OFDMA contention window defined in a selection range [$OCW_{min}$, $OCW_{max}$].

Once the current OBO backoff value reaches zero in a station (it is decremented at each new TF-R frame), the station can contend for RU access and thus can randomly select one RU from among all the random RUs defined in the received trigger frame. It then uses the selected RU to transmit data of at least one of the traffic queues.

This procedure is not efficient for station to contend for random access. There is thus a need to provide an efficient management of the OFDMA or RU backoff engine at the stations.

SUMMARY OF INVENTION

The present invention seeks to overcome the foregoing limitations.

According to one embodiment of the invention there is provided a method of communication in a wireless network comprising an access point and a plurality of stations, the method comprising, at one of said stations:

receiving a trigger frame from the access point, the trigger frame reserving a transmission opportunity on at least one communication channel of the wireless network, the transmission opportunity including random resource units that the stations may access using a contention scheme, wherein the trigger frame includes a first indicator specifying a traffic type of data allowed to be sent on at least one of the random resource units;

determining, based on the first indicator, eligible resource units, among the random resource units in the reserved transmission opportunity, for the station to contend for access for transmitting data; and transmitting data on a determined eligible resource unit using a contention scheme.

According to another embodiment of the invention there is provided a wireless communication method in a wireless network comprising an access point and a plurality of stations, the method comprising, at the access point, the step of sending a trigger frame to the stations, the trigger frame reserving a transmission opportunity on at least one communication channel of the wireless network, the transmission opportunity including random resource units that the stations may access using a contention scheme;

wherein the trigger frame includes a first indicator specifying a traffic type of data allowed to be sent on at least one of the random resource units and a second indicator indicating the stations allowed to sent data on said at least one random resource unit; and wherein if the second indicator indicates that the sending of data on a random resource unit is restricted to stations not associated with the access point, the first indicator specifies that any traffic type of data is allowed to be sent on said random resource unit.

According to another embodiment of the invention, there is provided a wireless communication method in a wireless network comprising an access point and a plurality of stations, the method comprising, at one of said stations:

receiving a trigger frame from the access point, the trigger frame reserving a transmission opportunity on at least one communication channel of the wireless network, the transmission opportunity including random resource units that the stations may access using a contention scheme, wherein the trigger frame includes at least one indicator specifying a transmission requirement for transmitting data on at least one of the random resource units;

determining, based on at least one indicator, eligible resource units, among the random resource units in the reserved transmission opportunity, for the station to contend for access for transmitting data; and transmitting data on a determined eligible resource unit using a contention scheme.

According to another embodiment of the invention, there is provided a wireless communication method in a wireless network comprising an access point and a plurality of stations, the method comprising, at one of said stations:

receiving a trigger frame from the access point, the trigger frame reserving a transmission opportunity on at least one communication channel of the wireless network, the transmission opportunity including random resource units that the stations may access using a contention scheme, determining eligible resource units, among the random resource units in the reserved transmission opportunity, the station is allowed to contend for access for transmitting data;

updating at least one contention parameter driving the contention scheme at said station based on the number of determined eligible resource units; and contending for access to an eligible resource unit using the contention scheme based on the updated at least one contention parameter.

In these embodiments, the trigger frame may include an indicator indicating the stations allowed to sent data on at least one random resource unit, and in that case, eligible resource units may be determined based on the indicator. For instance, the indicator may be based on an association identifier (AID).

Correspondingly, the same embodiments of the invention provide a communication device and/or an access point in a wireless network comprising an access point and a plurality of stations, the device or the access point comprising at least one microprocessor configured for carrying out the steps defined above.

Another aspect of the invention relates to a non-transitory computer-readable medium storing a program which, when executed by a microprocessor or computer system in a device, causes the device to perform any method as defined above.

BRIEF DESCRIPTION OF THE DRAWINGS

Further advantages of the present invention will become apparent to those skilled in the art upon examination of the drawings and detailed description. Embodiments of the invention will now be described, by way of example only, and with reference to the following drawings.

FIGS. 8a and 8b illustrate, using two flowcharts, general steps of first exemplary embodiments of the present invention for providing random access to OFDMA Resource Units for (uplink) multi-user OFDMA transmission;

FIG. 9 illustrates, using a flowchart, a communication method at a station of the wireless network according to one of the first embodiments;

FIGS. 10 illustrates, using flowcharts, a process of retrieval of an MPDU according to one implementation of the invention.

DETAILED DESCRIPTION

The invention will now be described by means of specific non-limiting exemplary embodiments and by reference to the figures.

Figure 1:
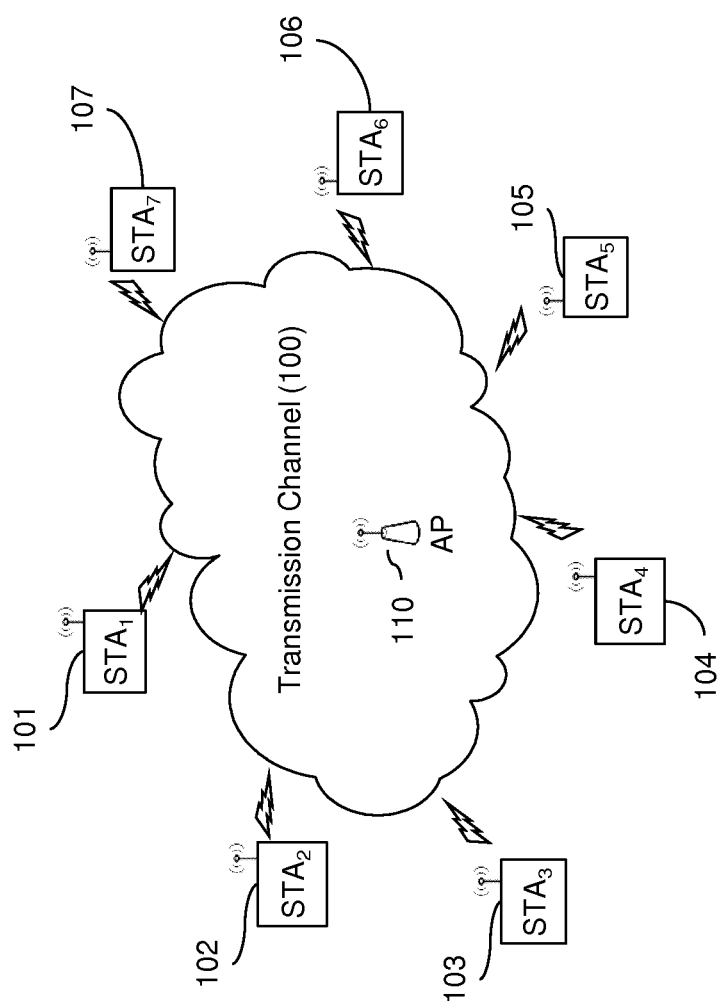
FIG. 1 illustrates a typical wireless communication system in which embodiments of the invention may be implemented.

FIG. 1 illustrates a communication system in which several communication nodes (or stations) 101-107 exchange data frames over a radio transmission channel 100 of a wireless local area network (WLAN), under the management of a central station, or access point (AP) 110 with which the stations have registered. The radio transmission channel 100 is defined by an operating frequency band constituted by a single channel or a plurality of channels forming a composite channel.

Access to the shared radio medium to send data frames is based on the CSMA/CA technique, for sensing the carrier and avoiding collision by separating concurrent transmissions in space and time.

Carrier sensing in CSMA/CA is performed by both physical and virtual mechanisms. Virtual carrier sensing is achieved by transmitting control frames to reserve the medium prior to transmission of data frames.

Next, a source or transmitting station, including the AP, first attempts, through the physical mechanism, to sense a medium that has been idle for at least one DIFS (standing for DCF InterFrame Spacing) time period, before transmitting data frames.

However, if it is sensed that the shared radio medium is busy during the DIFS period, the source station continues to wait until the radio medium becomes idle.

To access the medium, the station starts a countdown backoff counter designed to expire after a number of timeslots, chosen randomly in a so-called contention window [0, CW], CW being an integer. In the following, CW is also referred to as the contention window for simplicity. This backoff mechanism or procedure, also referred to as channel access scheme, is the basis of the collision avoidance mechanism that defers the transmission time for a random interval, thus reducing the probability of collisions on the shared channel. After the backoff time period (i.e. the backoff counter reaches zero), the source station may send data or control frames if the medium is idle.

One problem of wireless data communications is that it is not possible for the source station to listen while sending, thus preventing the source station from detecting data corruption due to channel fading or interference or collision phenomena. A source station remains unaware of the corruption of the data frames sent and continues to transmit the frames unnecessarily, thus wasting access time.

The Collision Avoidance mechanism of CSMA/CA thus provides positive acknowledgement (ACK) of the sent data frames by the receiving station if the frames are received with success, to notify the source station that no corruption of the sent data frames occurred.

The ACK is transmitted at the end of reception of the data frame, immediately after a period of time called Short InterFrame Space (SIFS).

If the source station does not receive the ACK within a specified ACK timeout or detects the transmission of a different frame on the channel, it may infer data frame loss. In that case, it generally reschedules the frame transmission according to the above-mentioned backoff procedure.

To improve the Collision Avoidance efficiency of CSMA/CA, a four-way handshaking mechanism is optionally implemented. One implementation is known as the RTS/CTS exchange, defined in the 802.11 standard.

The RTS/CTS exchange consists in exchanging control frames to reserve the radio medium prior to transmitting data frames during a transmission opportunity called TXOP in the 802.11 standard, thus protecting data transmissions from any further collisions. The four-way CTS/RTS handshaking mechanism is well known, and thus not further described here. Reference is made to the standard for further details.

The RTS/CTS four-way handshaking mechanism is very efficient in terms of system performance, in particular with regard to large frames since it reduces the length of the messages involved in the contention process.

In detail, assuming perfect channel sensing by each communication station, collision may only occur when two (or more) frames are transmitted within the same time slot after a DIFS (DCF inter-frame space) or when the backoff counters of the two (or more) source stations have reached zero nearly at the same time. If both source stations use the RTS/CTS mechanism, this collision can only occur for the RTS frames. Fortunately, such collision is early detected by the source stations upon not receiving a CTS response.

Management of quality of service (QoS) has been introduced at a station level in such wireless networks, through well-known EDCA mechanism defined in the IEEE 802.11e standard.

Indeed, in the original DCF standard, a communication station includes only one transmission queue/buffer. However, since a subsequent data frame cannot be transmitted until the transmission/retransmission of a preceding frame ends, the delay in transmitting/retransmitting the preceding frame prevented the communication from having QoS.

Figures 2A, 2B:
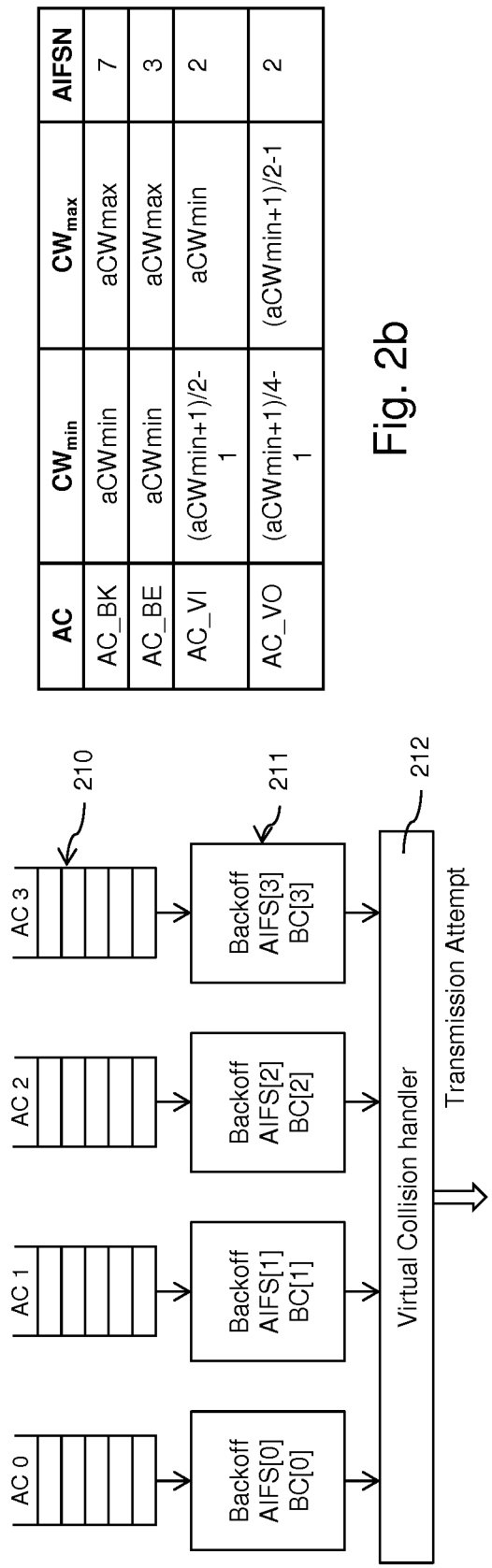
FIGS. 2a, 2b illustrate the IEEE 802.11e EDCA involving access categories.

FIGS. 2a and 2b illustrate the IEEE 802.11e EDCA mechanism involving access categories, in order to improve the quality of service (QoS).

The 802.11e standard relies on a coordination function, called hybrid coordination function (HCF), which has two modes of operation: enhanced distributed channel access (EDCA) and HCF controlled channel access (HCCA).

EDCA enhances or extends functionality of the original access DCF method: EDCA has been designed to support prioritized traffics similar to DiffServ (Differentiated Services), which is a protocol for specifying and controlling network traffic by class so that certain types of traffic get precedence.

EDCA is the dominant channel access scheme or mechanism in WLANs because it features a distributed and an easy to deploy mechanism. The scheme contends for access to at least one communication channel of the communication network using contention parameters, in order for the station to transmit data stored locally over an accessed communication channel.

The above deficiency of failing to have satisfactory QoS due to delay in frame retransmission has been solved with a plurality of transmission queues/buffers.

QoS support in EDCA is achieved with the introduction of four Access Categories (ACs), and thereby of four corresponding transmission/traffic queues or buffers (210). Usually, the four ACs are the following in decreasing priority order: voice (or "AC_VO"), video (or "AC_VI"), best effort (or "AC_BE") and background (or "AC_BK").

Of course, another number of traffic queues may be contemplated.

Each AC has its own traffic queue/buffer to store corresponding data frames to be transmitted on the network. The MAC data frames including payload data incoming from an upper layer of the protocol stack (namely the MSDUs) are mapped onto one of the four AC queues/buffers and thus input in the mapped AC buffer.

Each AC has also its own set of queue contention parameters, and is associated with a priority value, thus defining traffics of higher or lower priority of MSDUs. Thus, there is a plurality of traffic queues for serving data traffic at different priorities. The queue contention (EDCA) parameters usually include $CW_{min}$, $CW_{max}$, AIFSN and TXOP_Limit parameters for each traffic queue. $CW_{min}$ and $CW_{max}$ are the lower and higher boundaries of a selection range from which the EDCA contention window CW is selected for a given traffic queue. AIFSN stands for Arbitration Inter-Frame Space Number, and defines a number of time slots (usually 9 μs), additional to a DIFS interval (the total defining the AIFS period), the station must sense the medium as idle before decrementing the queue backoff value/counter associated with the traffic queue considered. TXOP_Limit defines the maximum size of a TXOP the station may request.

That means that each AC (and corresponding buffer) acts as an independent DCF contending entity including its respective queue backoff engine 211. Thus, each queue backoff engine 211 is associated with a respective traffic queue 210 for using queue contention parameters and setting a respective queue backoff value/counter (randomly selected from the contention window CW), to be used to contend for access to at least one communication channel in order to transmit data stored in the respective traffic queue over an accessed communication channel.

The contention window CW and the queue backoff value/counter are known as EDCA variables.

It results that the ACs within a same communication station compete one with each other to access the wireless medium and to obtain a transmission opportunity, using the conventional EDCA access scheme as explained above for example.

Service differentiation between the ACs is achieved by setting different EDCA (queue backoff) parameters between the ACs, such as different $CW_{min}$, $CW_{max}$, AIFSN and/or different transmission opportunity duration limits (TXOP_Limit). This contributes to adjusting QoS.

The usage of the AIFSN parameter and queue backoff values to access the medium in the EDCA mechanism is described below with reference to FIG. 3a.

FIG. 2b illustrates possible default values for the $CW_{min}$, $CW_{max}$ and AIFSN parameters.

In this table, typical respective values for $aCW_{min}$ and $aCW_{max}$ are defined in the above-mentioned standard as being respectively 15 and 1023. Other values may be set by a station in the network (typically an Access Point) and shared between the stations. This information may be broadcast in a beacon frame.

To determine the delay AIFS[i] between the detection of the medium being free and the beginning of the queue backoff value decrementing for traffic queue 'i', the station multiplies the value indicated in the AIFSN parameter for traffic queue 'i', i.e. AIFSN[i], by a time slot duration (typically 9 micro-seconds), and adds this value to a DIFS duration.

Figures 3A, 3B:
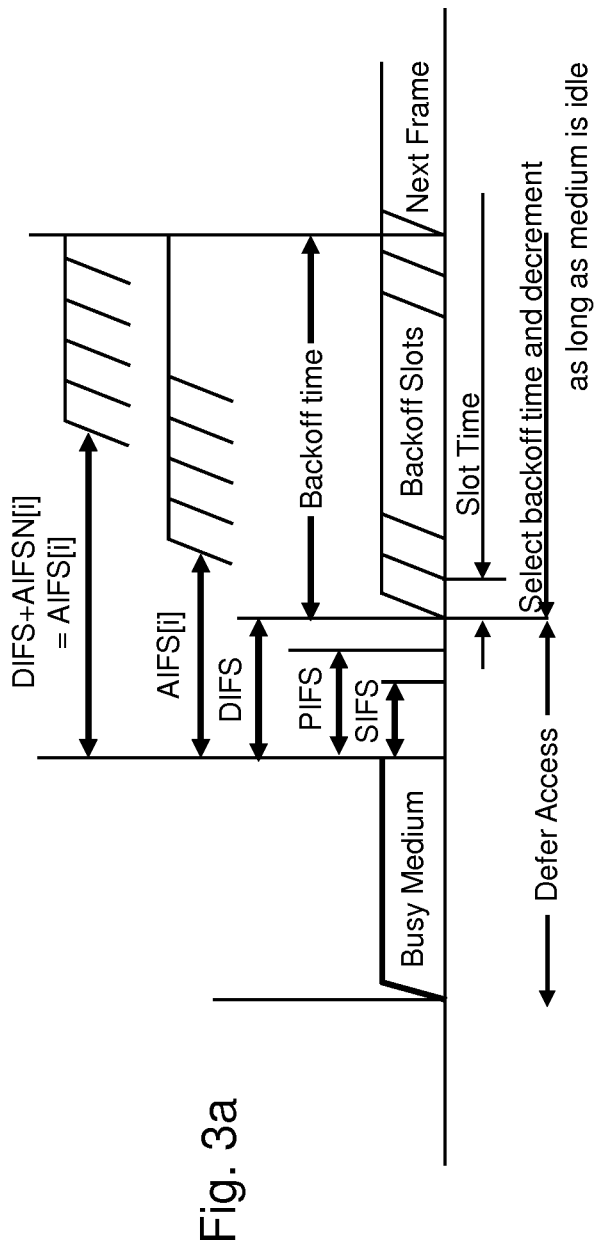
FIG. 3a illustrates 802.11ac mechanism for the backoff counter countdown.
FIG. 3b illustrates an example of mapping between eight priorities of traffic class and the four EDCA ACs.

As shown in FIG. 3a, it results that each traffic queue waits an AIFS[i] period (that includes the DIFS period deferring access to the medium) before decrementing its associated queue backoff value/counter. FIG. 3a shows two AIFS[i] corresponding to two different ACs. One can see that one prioritized traffic queue starts decrementing its backoff value earlier than the other less prioritized traffic queue. This situation is repeated after each new medium access by any station in the network.

This decrementing deferring mechanism, additional to the use of an on-average lower CW, makes that high priority traffic in EDCA has a higher chance to be transmitted than low priority traffic: a station with high priority traffic statistically waits a little less before it sends its packet, on average, than a station with low priority traffic.

The EDCA queue backoff values or counters thus play two roles. First, they drive the stations in efficiently accessing the medium, by reducing risks of collisions. Second, they offer management of quality of service, QoS, by mirroring the aging of the data contained in the traffic queue (the more aged the data, the lower the backoff value) and thus providing different priorities to the traffic queues through different values of the EDCA parameters (especially the AIFSN parameter that delays the start of the decrementing of the EDCA queue backoff values).

Referring back to FIG. 2a, buffers AC3 and AC2 are usually reserved for real-time applications (e.g., voice AC_VO or video AC_VI transmission). They have, respectively, the highest priority and the last-but-one highest priority.

Buffers AC1 and AC0 are reserved for best effort (AC_BE) and background (AC_BK) traffic. They have, respectively, the last-but-one lowest priority and the lowest priority.

Each data unit, MSDU, arriving at the MAC layer from an upper layer (e.g. Link layer) with a priority is mapped into an AC according to mapping rules. FIG. 3b shows an example of mapping between eight priorities of traffic class (User Priorities or UP, 0-7 according to IEEE 802.1d) and the four ACs. The data frame is then stored in the buffer corresponding to the mapped AC.

When the backoff procedure for a traffic queue (or an AC) ends, the MAC controller (reference 704 in FIG. 7 below) of the transmitting station transmits a data frame from this traffic queue to the physical layer for transmission onto the wireless communication network.

Since the ACs operate concurrently in accessing the wireless medium, it may happen that two ACs of the same communication station have their backoff ending simultaneously. In such a situation, a virtual collision handler (212 in FIG. 2a) of the MAC controller operates a selection of the AC having the highest priority (as shown in FIG. 3b) between the conflicting ACs, and gives up transmission of data frames from the ACs having lower priorities.

Then, the virtual collision handler commands those ACs having lower priorities to start again a backoff operation using an increased CW value.

The QoS resulting from the use of the ACs may be signalled in the MAC data frames, for instance in a QoS control field included in the header of the IEEE 802.11e MAC frame.

Figure 4:
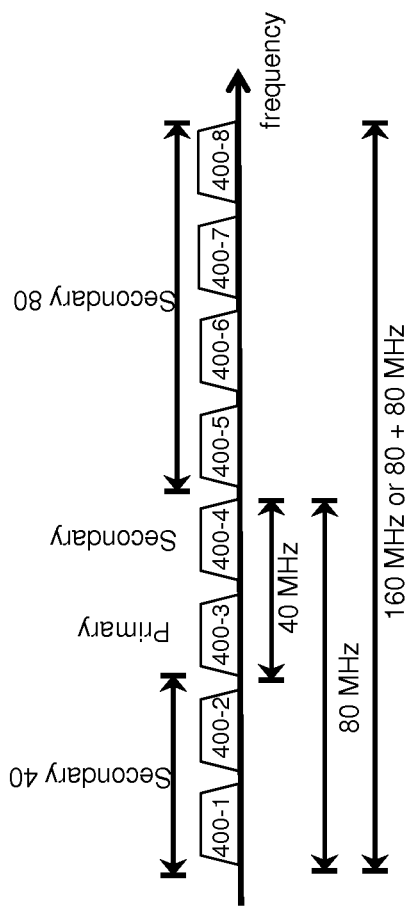
FIG. 4 illustrates 802.11ac channel allocation that support channel bandwidth of 20 MHz, 40 MHz, 80 MHz or 160 MHz as known in the art.

To meet the ever-increasing demand for faster wireless networks to support bandwidth-intensive applications, 802.11ac is targeting larger bandwidth transmission through multi-channel operations. FIG. 4 illustrates 802.11ac channel allocation that support composite channel bandwidth of 20 MHz, 40 MHz, 80 MHz or 160 MHz.

IEEE 802.11ac introduces support of a restricted number of predefined subsets of 20 MHz channels to form the sole predefined composite channel configurations that are available for reservation by any 802.11ac station on the wireless network to transmit data.

The predefined subsets are shown in FIG. 4 and correspond to 20 MHz, 40 MHz, 80 MHz, and 160 MHz channel bandwidths, compared to only 20 MHz and 40 MHz supported by 802.11n. Indeed, the 20 MHz component channels 400-1 to 400-8 are concatenated to form wider communication composite channels.

In the 802.11ac standard, the channels of each predefined 40 MHz, 80 MHz or 160 MHz subset are contiguous within the operating frequency band, i.e. no hole (missing channel) in the composite channel as ordered in the operating frequency band is allowed.

The 160 MHz channel bandwidth is composed of two 80 MHz channels that may or may not be frequency contiguous. The 80 MHz and 40 MHz channels are respectively composed of two frequency-adjacent or contiguous 40 MHz and 20 MHz channels, respectively. However the present invention may have embodiments with either composition of the channel bandwidth, i.e. including only contiguous channels or formed of non-contiguous channels within the operating band.

A station is granted a TXOP through the enhanced distributed channel access (EDCA) mechanism on the "primary channel" (400-3). Indeed, for each composite channel having a bandwidth, 802.11ac designates one channel as "primary" meaning that it is used for contending for access to the composite channel. The primary 20 MHz channel is common to all stations (STAs) belonging to the same basic set, i.e. managed by or registered with the same local Access Point (AP).

However, to make sure that no other legacy station (i.e. not belonging to the same set) uses the secondary channels, it is provided that the control frames (e.g. RTS frame/CTS frame) reserving the composite channel are duplicated over each 20 MHz channel of such composite channel.

As addressed earlier, the IEEE 802.11ac standard enables up to four, or even eight, 20 MHz channels to be bound. Because of the limited number of channels (19 in the 5 GHz band in Europe), channel saturation becomes problematic. Indeed, in densely populated areas, the 5 GHz band will surely tend to saturate even with a 20 or 40 MHz bandwidth usage per Wireless-LAN cell.

Developments in the 802.11ax standard seek to enhance efficiency and usage of the wireless channel for dense environments.

In this perspective, one may consider multi-user (MU) transmission features, allowing multiple simultaneous transmissions to/from different users in both downlink (DL) and uplink (UL) directions with a main station, usually an AP. In the uplink, multi-user transmissions can be used to mitigate the collision probability by allowing multiple stations to simultaneously transmit to the AP.

To actually perform such multi-user transmission, it has been proposed to split a granted 20 MHz channel into sub-channels (elementary sub-channels), also referred to as sub-carriers or resource units (RUs), that are shared in the frequency domain by multiple users, based for instance on Orthogonal Frequency Division Multiple Access (OFDMA) technique.

This is illustrated with reference to FIG. 5. The illustrated 20 MHz channels 500-1 to 500-4 may correspond for example, respectively, to channels 400-1 to 400-4 of FIG. 4.

The multi-user feature of OFDMA allows, a station, usually an access point, AP, to assign different RUs to different stations in order to increase competition. This may help to reduce contention and collisions inside 802.11 networks.

Contrary to MU downlink OFDMA wherein the AP can directly send multiple data to multiple stations, a trigger mechanism has been adopted for the AP to trigger MU uplink communications from various stations.

To support a MU uplink transmission (during a TXOP reserved by the AP), the 802.11ax AP has to provide signalling information for both legacy stations (non-802.11ax stations) to set their NAV and for 802.11ax stations to determine the Resource Units allocation.

In the following description, the term legacy refers to non-802.11ax stations, meaning 802.11 stations of previous technologies that do not support OFDMA communications.

Figure 5:
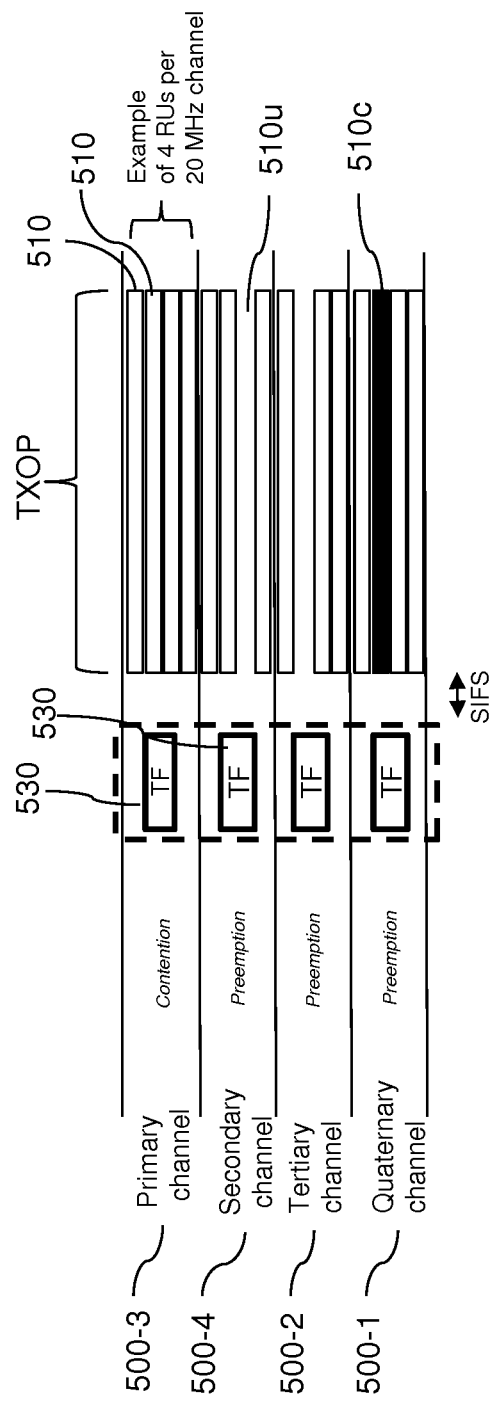
FIG. 5 illustrates an example of 802.11ax uplink OFDMA transmission scheme, wherein the AP issues a Trigger Frame for reserving a transmission opportunity of OFDMA sub-channels (resource units) on an 80 MHz channel as known in the art.

As shown in the example of FIG. 5, the AP sends a trigger frame (TF) 530 to the targeted 802.11ax stations. The bandwidth or width of the targeted composite channel is signalled in the TF frame, meaning that the 20, 40, 80 or 160 MHz value is signalled. The TF frame is sent over the primary 20 MHz channel 500-3 and duplicated (replicated) on each other 20 MHz channel forming the targeted composite channel, e.g. channels 500-1, 500-2 and 500-4. As described above for the duplication of control frames, it is expected that every nearby legacy station (non-HT or 802.11ac stations) receiving the TF frame (or a duplicate thereof) on its primary channel, then sets its NAV to the value specified in the TF frame. This prevents these legacy stations from accessing the channels of the targeted composite channel during the TXOP.

Based on an AP's decision, the trigger frame TF may define a plurality of resource units (RUs) 510 which can be randomly accessed by the stations of the network (referred to as "random RUs" or "random access RUs"). In other words, Random RUs designated or allocated by the AP in the TF may serve as basis for contention between stations willing to access the communication medium for sending data. A collision occurs when two or more stations attempt to transmit at the same time over the same RU.

In that case, the trigger frame is referred to as a trigger frame for random access (TF-R). A TF-R may be emitted by the AP to allow multiple stations to perform MU UL (Multi-User UpLink) random access to obtain an RU for their UL transmissions.

The trigger frame TF may also designate scheduled resource units, in addition to or in replacement of the Random RUs. Scheduled RUs may be reserved by the AP for certain stations in which case no contention for accessing such RUs is needed for these stations. Such RUs and their corresponding scheduled stations are indicated in the trigger frame. For instance, a station identifier, such as the Association ID (AID) assigned to each station upon registration, is added, in the TF frame, in association with each Scheduled RU in order to explicitly indicate the station that is allowed to use each Scheduled RU.

An AID equal to 0 may be used to identify random RUs.

Figure 11:
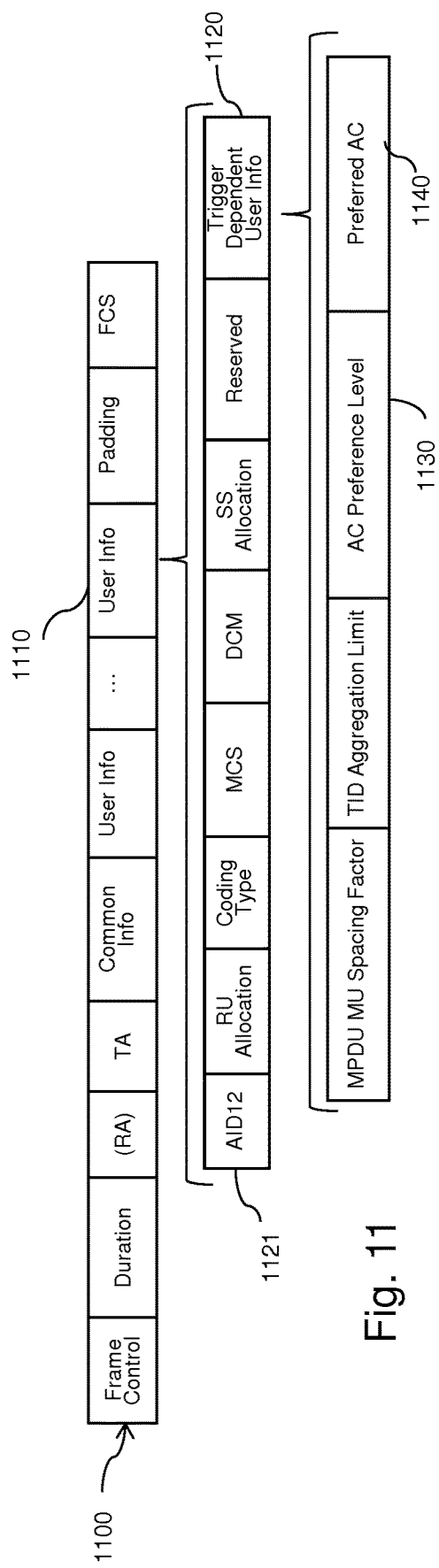
FIG. 11 illustrates the structure of a trigger frame according to an embodiment of the invention.

FIG. 11 illustrates the structure of a trigger frame according to an embodiment of the invention.

The trigger frame 1100 is composed of a dedicated field 1110 called User Info Field. There may be one or more User Info Fields in the trigger frame, each User Info Field gathering information related to one allocated RU. The trigger frame is thus composed of as many User Info Fields as the number of allocated RUs. Each allocated RU may be a scheduled RU or a random RU.

The User Info Field 1110 contains a "Trigger dependent User info" field 1120 which contains the "AC Preference Level" field 1130 and "Preferred AC" field 1140. The User Info Field 1110 further contains a AID12 field 1121 representing the 12 LSBs of the Association ID (AID) of the station for which the User Info field is intended, i.e. for which the RU is allocated. For example, an AID12 field 1121 that is 0 or 2045 indicates that the User Info field allocates an RU for random access; and an AID12 field 1121 that corresponds to the AID of a given station (different from 0 and 2045) indicates that the User Info field allocates an RU for a scheduled access to that given station.

The Preferred AC field 1140 is a 2-bit field indicating the AC queue (value from 0 to 3) from which data should be sent by the station on the RU allocated to that station in the trigger frame.

The AC preference Level field 1130 is a bit indicating if the value of the Preferred AC field 1140 is meaningful or not. If the field 1130 is set to 1, then the station should take into account the preferred AC field 1140 when selecting the AC queue from which data is transmitted. If the field 1130 is set to 0, the station is allowed to send data from any AC queue, regardless of the preferred AC field 1140 value.

The other fields of the trigger frame are similar to what is defined in the 802.11ax standard.

For example, the User Info Field 1110 may further contain the following fields as defined in the 802.11ax standard:
  "RU Allocation": identifies the allocated RU (i.e. width and location) within the potentially usable 160 MHz frequency band. For example, the "RU Allocation" field is 8 bits in length; the first bit indicates the allocated RU is located in the primary or non-primary 80 MHz, the subsequent 7 bits encodes a mapping of the width and location of the allocated RU within the 80 MHz band indicated by the first bit.
  "Coding Type": indicates the error correction code type that shall be used by the station to transmit in the allocated RU. For example, "Coding Type" field is 1 bit in length and is set to 0 for BCC (Binary Convolutional Code) and set to 1 for LDPC (Low-Density Parity Check).
  "MCS": indicates the Modulation and Coding Scheme (MCS) that shall be used by the station to transmit in the allocated RU.
  "DCM": indicates whether a dual carrier modulation (DCM) shall be used or not by the station to transmit in the allocated RU. For example, "DCM" field is 1 bit in length and is set to 1 to indicate that DCM shall be used and set to 0 to indicate that DCM shall not be used.
  "SS Allocation": indicates the number of (MIMO) spatial streams of the station identified by the AID12 subfield.
  "Target RSSI": indicates the target received signal power by the AP of the data frame sent by the station in the allocated RU. The value of the "Target RSSI" allows to determine the transmit power requirements the station shall comply with to transmit in the allocated RU.

The multi-user feature of OFDMA allows the AP to assign different RUs to different stations in order to increase competition. This may help to reduce contention and collisions inside 802.11 networks.

In the example of FIG. 5, each 20 MHz channel (500-1, 500-2, 500-3 and 500-4) is sub-divided in the frequency domain into four sub-channels or RUs 510, typically of size 5 Mhz.

Of course the number of RUs splitting a 20 MHz channel may be different from four. For instance, between two to nine RUs may be provided (thus each having a size between 10 MHz and about 2 MHz).

Once the stations have used the RUs to transmit data to the AP, the AP responds with an acknowledgment ACK (not show in the Figure) to acknowledge the data on each RU, making it possible for each station to know when its data transmission is successful (reception of the ACK) or not (no ACK after expiry of a time-out).

As shown in FIG. 5, some Resource Units may not be used (e.g. 510u) because no station has randomly selected one of these random RUs, whereas some others have collided (e.g. 510c) because two of these stations have randomly selected the same RU.

The MU Uplink (UL) medium access scheme, including both scheduled RUs and random RUs, proves to be very efficient compared to conventional EDCA access scheme. This is because the number of collisions generated by simultaneous medium access attempts and the overhead due to the medium access are both reduced. However, random RU access procedure still needs to be improved.

Figure 6:
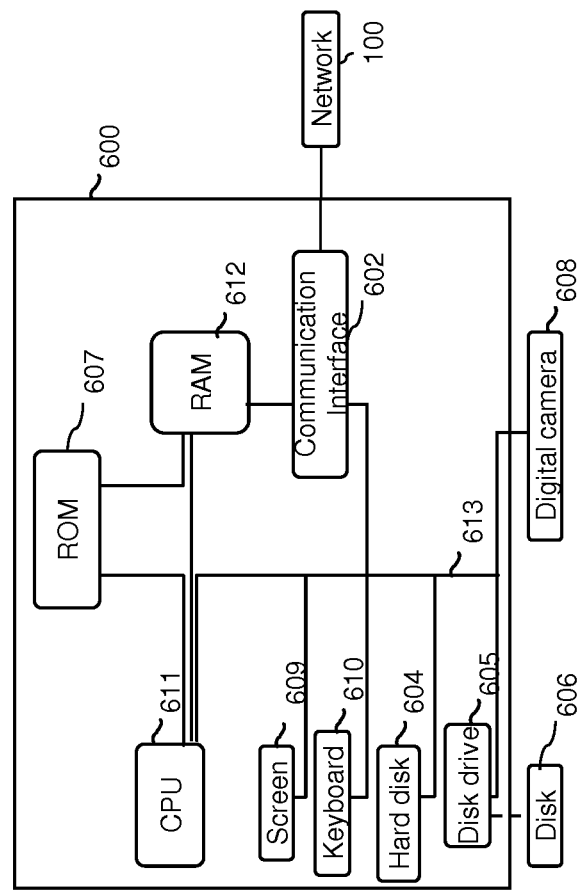
FIG. 6 shows a schematic representation a communication device or station in accordance with embodiments of the present invention.

FIG. 6 schematically illustrates a communication device 600 of the radio network 100, configured to implement at least one embodiment of the present invention. The communication device 600 may preferably be a device such as a micro-computer, a workstation or a light portable device. The communication device 600 comprises a communication bus 613 to which there are preferably connected:

- a central processing unit 611, such as a microprocessor, denoted CPU;
- a read only memory 607, denoted ROM, for storing computer programs for implementing the invention;
- a random access memory 612, denoted RAM, for storing the executable code of methods according to embodiments of the invention as well as the registers adapted to record variables and parameters necessary for implementing methods according to embodiments of the invention; and
- at least one communication interface 602 connected to the radio communication network 100 over which digital data packets or frames or control frames are transmitted, for example a wireless communication network according to the 802.11ax protocol. The frames are written from a FIFO sending memory in RAM 612 to the network interface for transmission or are read from the network interface for reception and writing into a FIFO receiving memory in RAM 612 under the control of a software application running in the CPU 611.

Optionally, the communication device 600 may also include the following components:

- a data storage means 604 such as a hard disk, for storing computer programs for implementing methods according to one or more embodiments of the invention;
- a disk drive 605 for a disk 606, the disk drive being adapted to read data from the disk 606 or to write data onto said disk;
- a screen 609 for displaying decoded data and/or serving as a graphical interface with the user, by means of a keyboard 610 or any other pointing means.

The communication device 600 may be optionally connected to various peripherals, such as for example a digital camera 608, each being connected to an input/output card (not shown) so as to supply data to the communication device 600.

Preferably the communication bus provides communication and interoperability between the various elements included in the communication device 600 or connected to it. The representation of the bus is not limiting and in particular the central processing unit is operable to communicate instructions to any element of the communication device 600 directly or by means of another element of the communication device 600.

The disk 606 may optionally be replaced by any information medium such as for example a compact disk (CD-ROM), rewritable or not, a ZIP disk, a USB key or a memory card and, in general terms, by an information storage means that can be read by a microcomputer or by a microprocessor, integrated or not into the apparatus, possibly removable and adapted to store one or more programs whose execution enables a method according to the invention to be implemented.

The executable code may optionally be stored either in read only memory 607, on the hard disk 604 or on a removable digital medium such as for example a disk 606 as described previously. According to an optional variant, the executable code of the programs can be received by means of the communication network 603, via the interface 602, in order to be stored in one of the storage means of the communication device 600, such as the hard disk 604, before being executed.

The central processing unit 611 is preferably adapted to control and direct the execution of the instructions or portions of software code of the program or programs according to embodiments of the invention, which instructions are stored in one of the aforementioned storage means. On powering up, the program or programs that are stored in a non-volatile memory, for example on the hard disk 604 or in the read only memory 607, are transferred into the random access memory 612, which then contains the executable code of the program or programs, as well as registers for storing the variables and parameters necessary for implementing the invention.

In a preferred embodiment, the apparatus is a programmable apparatus which uses software to implement the invention. However, alternatively, the present invention may be implemented in hardware (for example, in the form of an Application Specific Integrated Circuit or ASIC).

Figure 7:
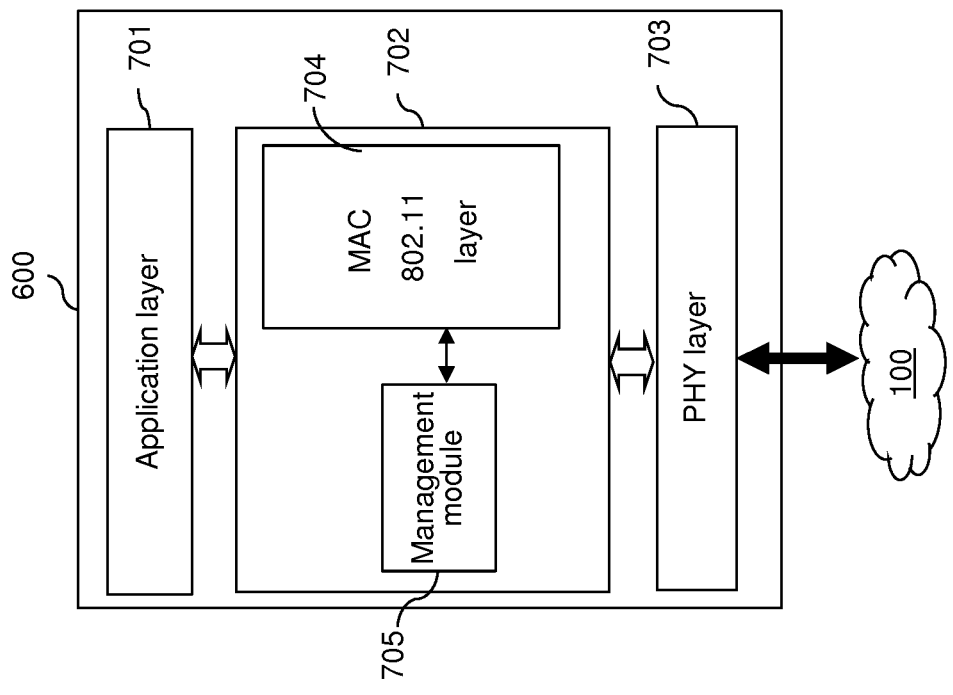
FIG. 7 shows a schematic representation of a wireless communication device in accordance with embodiments of the present invention.

FIG. 7 is a block diagram schematically illustrating the architecture of a communication device or station 600, in particular one of stations 100-107, adapted to carry out, at least partially, the invention. As illustrated, station 600 comprises a physical (PHY) layer block 703, a MAC layer block 702, and an application layer block 701.

The PHY layer block 703 (here an 802.11 standardized PHY layer) has the task of formatting frames, modulating frames on or demodulating frames from any 20 MHz channel or the composite channel, and thus sending or receiving frames over the radio medium used 100. The frames may be 802.11 frames, for instance medium access trigger frames TF 530 to define resource units in a granted transmission opportunity, MAC data and management frames based on a 20 MHz width to interact with legacy 802.11 stations, as well as of MAC data frames of OFDMA type having smaller width than 20 MHz legacy (typically 2 or 5 MHz) to/from that radio medium.

The MAC layer block or controller 702 preferably comprises a MAC 802.11 layer 704 implementing conventional 802.11ax MAC operations, and a management module 705 for carrying out, at least partially, embodiments of the invention. The MAC layer block 702 may optionally be implemented in software, which software is loaded into RAM 612 and executed by CPU 611.

MAC 802.11 layer 704 and management module 705 interact one with the other in order to provide management of the channel access module handling the queue backoff engines and a RU access module handling a RU backoff engine.

On top of the Figure, application layer block 701 runs an application that generates and receives data packets, for example data packets of a video stream. Application layer block 701 represents all the stack layers above MAC layer according to ISO standardization.

The present invention in its different aspects is now illustrated using various exemplary embodiments from the stations' perspective (FIGS. 8*a*, 9 and 10) and from the AP's perspective (FIG. 8*b*).

The invention may relate to embodiments from the station's perspective only, to embodiments from the AP's perspective only, or to both. For example, embodiments from the stations' perspective can operate with embodiments from the AP's perspective or with a conventional implementation of an AP according to IEEE 802.11ax. Reciprocally, embodiments from the AP's perspective can operate with embodiments from the stations' perspective or with a conventional implementation of a station according to IEEE 802.11ax.

These exemplary embodiments are described in the context of IEEE 802.11ax by considering OFDMA sub-channels. Application of the invention is however not limited to IEEE 802.11ax context. For example, embodiments of the invention do not necessarily rely on the usage of an OFDMA scheme, and any other scheme defining alternate resource units (e.g. TDMA sub-channels) or more generally channels to be access simultaneously or sequentially can also be used.

FIGS. 8*a* and 8*b* illustrate, using two flowcharts, general steps of first exemplary embodiments of the present invention for providing random access to OFDMA Resource Units for (uplink) multi-user OFDMA transmission. FIG. 8*a* illustrates an embodiment from the (non-AP) station's perspective and FIG. 8*b* illustrates an embodiment from the AP's perspective. A station, including the AP, typically implements a communication device 600 as illustrated in FIG. 6.

At step 810, the station receives a trigger frame from the access point reserving a transmission opportunity TXOP on at least one communication channel of the wireless network 100. The transmission opportunity includes random resource units that the stations of the wireless network 100 may access using a contention scheme. Also, the trigger frame includes a first indicator specifying a traffic type of data allowed to be sent on at least one of the random resource units. Preferably, a first indicator is associated with each random resource unit.

In the context of 802.11ax, the first indicator is typically provided by the "Preferred AC" field 1140 included in the trigger frame (cf. FIG. 11).

Based on the first indicator(s), eligible resource units are determined by the station among the resource units in the reserved transmission opportunity (step 820), and data is transmitted on a determined eligible resource unit using a contention scheme (step 830).

In a variant implementation, eligible resource units are determined at step 820 based on indicators that define if a station is allowed to use a random RU for transmitting data.

In a variant implementation, eligible resource units are determined at step 820 based on indicators that define if a station is capable of using a random RU for transmitting data.

Note that in the whole document eligible resource units may equivalently be referred to as "eligible random RUs" or "eligible random access RUs".

An eligible random RU may be defined as a RU for which the station has data in a buffer of an access category (AC) that corresponds to the traffic type of the first indicator associated with the RU.

In a variant, an eligible random RU may be defined as a RU that the station is allowed to use to contend for access and send data. For example:
  RU(s) may be reserved for stations already associated with the AP (e.g. RUs with AID equals 0);
  RU(s) may be reserved for non-associated stations (e.g. RUs with AID equals 2045);
  RU(s) may be reserved for one or more groups of stations, for example to manage their access to the medium and increase their chances to gain the access. Different predefined values of AID may be assigned to different groups. A predefined AID value can be used to designate a set of stations with a same profile or gathered in a same group (multicast) to contend together. For instance, a group of stations may gather IOT (Internet of Thinks) stations or sensors measuring the temperature. Another example can be a group of stations executing or participating to a dedicated usage scenario (a set of video camera exchanging data with a video server . . . );
  RU(s) may be reserved for a certain category of stations to increase their chances to gain access to the medium, e.g. stations which were unsuccessful in their previous attempts to access the medium (e.g. identified using a predetermined value of AID).

In all above cases, a random RU that is reserved for a station is considered as allowable for that station to use and thus the random RU is an eligible random RU for that station.

In a variant, an eligible random RU may be defined as a RU that the station is capable of using for transmitting data. The indicators are included in the trigger frame and represent transmission requirements associated with the allocated RU (e.g. physical transmission requirements). The RU is an eligible RU if the transmission capabilities of the station (e.g. physical transmission capabilities) do match the transmission requirements associated with the RU. For example, one (or a combination) of the following transmission requirements can be used as indicator(s) for defining the eligibility of a RU:
  width and/or location of the RU (information obtained from "RU Allocation" field); for instance, if the allocated RU is located in a secondary 20 MHz channel the station is not capable to access, the RU is considered as not eligible;
  error correction coding type (information obtained from the "Coding Type" field); for instance, if the AP imposes for the allocated RU a coding type that the station is not capable to implement, the RU is considered as not eligible;

modulation and coding scheme (information obtained from the "MCS" field); for instance, if the station is capable of implementing one of the authorized modulation and coding schemes, then the RU is considered as eligible;

dual carrier modulation (information obtained from "DCM" field); for instance, if the DCM shall be used and the station does not support it, the RU is considered as not eligible;

number of spatial streams (information obtained from "SS Allocation" field); for instance, if the station is capable of using the minimum number of spatial streams required by the AP for the allocated RU, then the RU is considered as eligible;

target received power (information obtained from "Target RSSI" field); for instance, if the station determines the it is not capable of reaching the target received power, then the RU is considered as not eligible In a further variant, an eligible random RU may be defined as a RU that the station is allowed to use (according to the above criteria) and/or the station is capable of using (according to at least one of the above transmission requirements) and/or for which the station has data in a buffer of an access category (AC) that corresponds to the traffic type of the first indicator associated with the RU.

According to one implementation, an eligible random RU is defined as a RU satisfying at least one of the following:

The AP specifies a value of AC_BK in the Preferred AC field 1140 (first indicator) in the Trigger Dependent User Info field and the AID value in AID12 field 1121 (referred to as second indicator) is equal to 0 for an associated station.

The AP specifies a value of AC_BK in the Preferred AC field 1140 in the Trigger Dependent User Info field and the AID value in AID12 field 1121 is equal to 2045 for a non-associated station.

The AP specifies a value different from AC_BK in the Preferred AC field 1140 in the Trigger Dependent User Info field, the AID value in AID12 field 1121 is equal to 0 for an associated station and the station should have at least one MPDU ready to be transmitted in the access category equal to the Preferred AC field in the Trigger Dependent User Info field.

The AP specifies a value different from AC_BK in the Preferred AC field 1140 in the Trigger Dependent User Info field, the AID value in AID12 field 1121 is equal to 2045 for a non-associated station and the non-associated station should have at least one MPDU ready to be transmitted in the access category equal to the Preferred AC field in the Trigger Dependent User Info field.

Consequently, instead of randomly choosing a resource unit among the random resource units defined in the trigger frame and then checking which eligible data, if any, can be transmitted by the station in the chosen resource unit based on the traffic type of the first indicator associated with the RU, the invention in one of its embodiments first filters the random resource units defined in the trigger frame based on the first indicator, thereby obtaining eligible random resource units, and then chooses a resource unit among the eligible resource units for transmitting data. This advantageously avoids choosing a RU for which the station has no eligible data to send and thus avoids loosing an opportunity for sending data by the station.

Similarly, instead of randomly choosing a resource unit among the random resource units defined in the trigger frame and then checking if the station is allowed to use, and/or is capable of using, the chosen RU, the invention in one of its embodiments first filters the random resource units defined in the trigger frame based on one or more transmission requirements associated with the RU, thereby obtaining eligible random resource units, and then chooses a resource unit among the eligible resource units for transmitting data. This advantageously avoids choosing a RU that the station cannot eventually use and enhances the overall performance, particularly by reducing the medium access time for the station and the risk of collisions.

We refer now to FIG. 8b concerning a process executed at the AP according to one embodiment of the invention.

At step 840, the AP defines a second indicator associated with a RU to be signaled in a trigger frame. Typically, this corresponds to assigning an AID value to the random resource units. For example, a random RU that is reserved for stations associated with the AP is assigned an AID equal to zero, while a random RU that is reserved for stations not yet associated with the AP is assigned an AID of a predetermined value different from zero, typically 2045.

Depending on the value of the second indicator (test 850), different restrictions may be applied by the AP regarding the traffic type of data allowed to be sent on the random resource unit by stations.

If the RU is reserved for stations not associated with the AP (test 850 positive), the value of the first indicator is set so that not to limit the traffic type of data, for example by choosing the value of AC_BK to indicate that background data, but also higher priority data (thus any traffic type of data), can be transmitted (step 851). In fact, stations not (yet) associated with the AP may exchange only control frames with the AP, and thus certain access categories may not be applicable (e.g. AC_VI).

If the RU is reserved for stations associated with the AP (test 850 negative), the value of the first indicator is set to any one of the traffic type categories, e.g. AC_BK, AC_BE, AC_VI and AC_VO, according to a policy defined by the AP (step 852). Note that AC_BK value may be one of those values.

In one implementation, if AID indicates a non-associated station, the AP sets a value of "only" AC_BK in the Preferred AC, otherwise, the AP sets a value of AC_BK, AC_BE, AC_VI, or AC_VO in the Preferred AC.

At step 860, the AP sends the trigger frame to the stations including the set first and second indicators.

FIG. 9 illustrates, using a flowchart, a communication method at a station of the wireless network according to one of the first embodiments.

Steps 910 and 920 are similar to steps 810 and 820 of FIG. 8a respectively, and their description will not be repeated here.

At step 930, a test is performed to determine if at least one eligible random RU is found. If the test is negative, the reception of a further trigger frame is waited for.

If the test 930 is positive, a contention procedure of accessing a random RU is executed.

In one implementation, a dedicated backoff engine, referred below to as OFDMA or RU backoff engine, to contend for access to the random RUs is maintained. The dedicated OFDMA or RU backoff, also called OBO, is randomly assigned in a contention window range [0, OCW] wherein OCW is the OFDMA contention window defined in a selection range [$OCW_{min}$, $OCW_{max}$]. The OCW, $OCW_{min}$, $OCW_{max}$ and RU backoff (OBO) represent contention parameters driving the contention scheme for accessing the random RUs.

Once the current OBO backoff value reaches zero in a station (it is decremented at each new TF-R frame), the station becomes eligible for RU access and thus can select one eligible RU from among the determined eligible random RUs (step 970). It then uses the selected RU to transmit data of at least one of the traffic queues (step 990).

At step 940, the station checks if the OBO backoff value still has to be decremented or a new OBO value needs to be assigned. If a new value is needed, an OBO value is randomly drawn in the range [0, OCW] (step 950).

Then a check is performed at step 960 to determine if the OBO current value is lower or equal to the number of eligible RUs. Note that in this implementation, only eligible random RUs are considered (and not all random RUs or all RUs) for better efficiency and fairness.

If test 960 is negative (OBO current value greater than the number of eligible RUs), it means that the station is still not allowed to contend for access. The value of OBO is updated at step 965, typically by subtracting the number of eligible RUs. The station then waits for a new transmission opportunity.

If test 960 is positive (OBO current value is lower or equal to the number of eligible RUs), the station is allowed to contend for access.

At step 970, the station selects one RU among the determined eligible RUs. In one variant, the selection is done on random basis among the eligible RUs.

At step 980, the station builds a data frame (PPDU) to be transmitted in the selected random RU. The PPDU is built from multiple MPDU retrieved from the access categories. In one implementation, the MPDUs can be randomly retrieved from any queues of the access categories. In another implementation, the station determines the MPDU to be transmitted based on its internal priorities, such the current backoff values associated to each access category.

In one implementation, the MPDUs can be retrieved based on the process described in the FIG. 10. Indeed based on the value of preferred AC field of the selected random RUs (step 1020), the station selects at least one MPDU from a queue corresponding to one of its access categories. The access category specified by the preferred AC field is selected, if the preferred AC field is equal to a predefined access category (e.g. AC_BK access category) (step 1030). If the preferred AC field is not equal to a predefined access category, the station can select MPDUs from any access categories (step 1040).

In an implementation, when the AP specifies a value in the Preferred AC field in the Trigger Dependent User Info field of a Trigger frame, then a station with buffered traffic in the indicated preferred AC should aggregate at least one MPDU from any one of the TIDs (Traffic IDentifier field included in the header of a MAC frame) from the same AC and MPDUs from any one of the TIDs from the same AC or higher AC as indicated in the Preferred AC field of the Trigger Dependent User Info field in the Trigger frame.

Back to FIG. 9, at step 990, the built PPDU is transmitted in the selected random resource unit in a multi user uplink transmission.

Many further modifications and variations will suggest themselves to those versed in the art upon making reference to the foregoing illustrative embodiments, which are given by way of example only and which are not addressed to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A wireless communication method in a wireless network comprising an access point and a plurality of stations, the method comprising, at one of the stations:
   receiving a trigger frame from the access point, the trigger frame reserving a transmission opportunity on at least one communication channel of the wireless network, the transmission opportunity including random resource units that the stations may access using a contention scheme, wherein the trigger frame includes an association identifier (AID) and at least one transmission parameter for transmitting data on at least one of the random resource units;
   determining, based at least on the at least one transmission parameter, one or more eligible resource units, among the random resource units included in the reserved transmission opportunity, for the station to contend for access for transmitting data;
   updating at least one contention parameter for the contention scheme at the station based on the number of determined eligible resource unit or units, wherein the at least one contention parameter is not updated in a case where there is no eligible resource unit among the random resource units; and
   contending for access to an eligible resource unit using the contention scheme based on the updated at least one contention parameter,
   wherein determining an eligible resource unit comprises determining that the station is capable of transmitting data in that resource unit according to the at least one transmission parameter specified in the trigger frame for the resource unit.

2. The wireless communication method of claim 1, wherein the at least one transmission parameter is a first indicator specifying a traffic type of data allowed to be sent on at least one of the random resource units.

3. The wireless communication method of claim 1, wherein the at least one transmission parameter is one of the following: Error Correction Coding type; modulation and coding scheme; dual carrier modulation; number of spatial streams and target received power.

4. The wireless communication method of claim 1, wherein eligible resource unit or units are further determined based on the association identifier (AID).

5. The wireless communication method of claim 4, wherein the association identifier (AID) indicates whether each of the random resource units is allocated for stations associated with the AP or for stations not associated with the AP.

6. The wireless communication method of claim 5, wherein a random resource unit is determined as an eligible resource unit when:
   the station supports all transmission parameters associated with the resource unit and,
   the association identifier (AID) indicates that the resource unit is allocated for associated stations and the station is associated with the AP, or the association identifier (AID) indicates that the resource unit is allocated for not associated stations and the station is not associated with the AP.

7. The wireless communication method of claim 1, wherein a contention parameter is a backoff value of a resource unit backoff engine and wherein the updating of the at least one contention parameter comprises updating the backoff value based on the number of determined eligible resource unit or units.

8. The wireless communication method of claim 1, wherein the at least one transmission parameter is associated with a resource unit.

9. The wireless communication method of claim 1, wherein a plurality of transmission parameters are associated with a resource unit and wherein the determining of eligible resource unit or units is based on the plurality of transmission parameters.

10. The wireless communication method of claim 1, wherein the at least one transmission parameter includes a physical transmission parameter associated with the at least one random resource unit, and the determining includes determining one or more eligible resource units whose physical transmission parameters match physical transmission capabilities of the station.

11. The wireless communication method of claim 1, wherein the random resource units allocated for stations associated with the access point are determined as being resource units to which an AID equal to 0 is allocated.

12. A communication device in a wireless network comprising an access point and a plurality of stations, the communication device being one of the stations and comprising at least one microprocessor configured for carrying out the steps of:
 receiving a trigger frame from the access point, the trigger frame reserving a transmission opportunity on at least one communication channel of the wireless network, the transmission opportunity including random resource units that the stations may access using a contention scheme, wherein the trigger frame includes an association identifier (AID) and at least one transmission parameter for transmitting data on at least one of the random resource units;
 determining, based at least on the at least one transmission parameter, one or more eligible random resource units, among the random resource units included in the reserved transmission opportunity, for the station to contend for access for transmitting data;
 updating at least one contention parameter for the contention scheme at the station based on the number of determined eligible resource unit or units, wherein the at least one contention parameter is not updated in a case where there is no eligible resource unit among the random resource units; and
 contending for access to an eligible random resource unit using the contention scheme based on the updated at least one contention parameter,
 wherein determining an eligible resource unit comprises determining that the station is capable of transmitting data in that resource unit according to the at least one transmission parameter specified in the trigger frame for the resource unit.

13. A non-transitory computer-readable medium storing a program which, when executed by a microprocessor or computer system in a station of a wireless network comprising an access point and a plurality of stations, causes the station to:
 receive a trigger frame from the access point, the trigger frame reserving a transmission opportunity on at least one communication channel of the wireless network, the transmission opportunity including random resource units that the stations may access using a contention scheme, wherein the trigger frame includes an association identifier (AID) and at least one transmission parameter for transmitting data on at least one of the random resource units;
 determine, based at least on the at least one transmission parameter, one or more eligible resource units, among the random resource units included in the reserved transmission opportunity, for the station to contend for access for transmitting data;
 update at least one contention parameter for the contention scheme at the station based on the number of determined eligible resource unit or units, wherein the at least one contention parameter is not updated in a case where there is no eligible resource unit among the random resource units; and
 contend for access to an eligible resource unit using the contention scheme based on the updated at least one contention parameter,
 wherein determining an eligible resource unit comprises determining that the station is capable of transmitting data in that resource unit according to the at least one transmission parameter specified in the trigger frame for the resource unit.

* * * * *